United States Patent Office 3,475,275
Patented Oct. 28, 1969

3,475,275
METHOD FOR THE PRODUCTION OF 3α,5-CYCLO-6β,19-OXIDO-5α-ANDROSTAN-17-ONE
Makoto Shirasaka, Atsushi Naito, and Katsumi Tanabe, Tokyo, Japan, assignors to Sankyo Company Limited, Tokyo, Japan
No Drawing. Filed Jan. 26, 1967, Ser. No. 611,800
Claims priority, application Japan, Feb. 1, 1966, 41/5,799
Int. Cl. C12d *13/08;* C07c *173/00*
U.S. Cl. 195—51          4 Claims

ABSTRACT OF THE DISCLOSURE

Process for producing 3α,5-cyclo-6β,19-oxido-5α-androstan-17-one. A compound of the formula

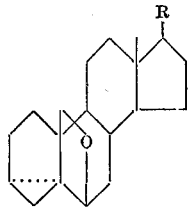

wherein R is a hydrocarbyl side chain of 8 to 10 carbon atoms is subjected to the microbial action of a microorganism of the genera Corynebacterium and Arthrobacter. The compound may alternatively be subjected to the action of the enzymes produced by these microorganisms under aerobic conditions.

---

This invention relates to a novel method for the production of a steroidal compound. More particularly, it relates to a novel method for the production of 3α,5-cyclo-6β,19-oxdio-5α-androstan-17-one by fermentation.

The above-indicated particular steroid of androstane series is a steroidal compound which is well-known in the art to be useful as a valuable intermediate for the producton of various 19-norsteroids, for example, of 19-nortestosterone derivatives with anabolic or progestational activity.

The chemical synthesis of the said particular androstane was formerly rewarded with success (See, French Patent No. 1,353,691, granted to K. Tanabe et al. on 20th, Jan., 1964). It would be, however, strongly desired in the art to find out the more advantageous method for the production of the said androstane.

As a result of our investigations on a method for the microbiological production of the said androstane, it has been unexpectedly found that various natural 3α,5-cyclo-6β,19-oxido sterols having a hydrocarbyl side chain at 17-position of a steroidal skeleton can be satisfactorily converted to 3α,5-cyclo-6β,19-oxido-5α-androstan-17-one with oxidative degradation of the sterol side chain by the action of a microorganism selected from those microorganisms of the genera Corynebacterium and Arthrobacter.

It is, therefore, an object of this invention to provide a novel and advantageous method for the microbiological production of 3α,5-cyclo-6β,19-oxido-5α-androstan-17-one by the action of a microorganism of the genera Corynebacterium or Arthrobacter.

Other objects of this invention will be apparent to those skilled in the art from the following disclosure.

Thus, in accordance with this invention, there is provided a new method for the production of 3α,5-cyclo-6β,19-oxido-5α-androstan-17-one which comprises subjecting the sterol having the formula

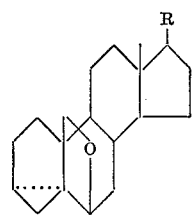

(I)

wherein R is a hydrocarbyl side chain of 8 to 10 carbon atoms to the action of a microorganism selected from those microorganisms of the genera Corynebacterium and Arthrobacter under aerobic condition or to the action of the enzymes produced by the said microorganism under aerobic condition.

A process for preparing compounds corresponding to the above starting material has been disclosed in French Patent No. 1,353,691 previously referred to.

In the microbiological method of this invention as depicted above, typical examples of the sterol (I) to be employed as a substrate include the following sterols:

3α,5-cyclo-6β,19-oxido-5α-chloestane,
3α,5-cyclo-6β,19-oxido-5α-ergostane,
3α,5-cyclo-6β,19-oxido-5α-sitostane,
and
3α,5-cyclo-6β,19-oxido-5α-stigmastane.

Typical examples of the microorganisms which have been found to be useful for the method of this invention include those microorganims belonging to *Corynebacterium equi* (IAM 1038), *Corynebacterium xerosis, Arthrobacter simplex* (IAM 1660), and *Arthrobacter ureafaciens* (IAM 1658). These microorganims were described in the literature and are kell-known in the art. They are thus described in Bergey's Manual of Determinative Bacteriology, 7th edition (1957), pages 585–610, and the strains are freely available.

In carrying out the method of this invention, such a microorganism as described above as such may be inoculated cultivated in a suitable culture medium containing the said sterol (I) as a substrate under aerobic condition. The method may also be carried out by employing the said microorganism after adaptation, i.e. the culture in which the said microorganism had previously incubated in a suitable medium containing the said sterol (I) may be incorporated and cultivated in a suitable culture medium containing the said sterol (I) as a substrate under aerobic condition. Alternatively, the microorganism may be inoculated and cultivated in a suitable culture medium containing no substrate under aerobic condition and successively the aerobic culture is conducted after addition of the substrate. Moreover, the method of this invention may be successfully conducted by employing as an inoculum the enzymes (or the crude liquor thereof) obtained from the growing microorganism through disruption of the cell by a conventional means, for example, by a French Press, a sonic oscillator, lyzozyme, a surface active agent and the like. In any case, the aerobic condition should be kept in the present method.

The culture medium may be composed of usual ingredients commonly used for the cultivation of such microorganisms as desired above. Suitable culture medium contains a source of carbon, nitrogen and, if necessary, mineral elements (inorganic salts). Suitable carbon sources include glucose, sucrose, xylose, cane sugar, starch, glycerin and the like. Suitable nitrogen sources include corn steep liquor, peptone, yeast extract, meat extract, soybean meal and the like. Suitable mineral elements include sodium chloride, ammonium nitrate, magnesium sulfate, calcium carbonate, dipotassium hydrogenphosphate and the like.

In carrying out the fermentation, there may be satisfactorily employed any of aerobic culture procedures commonly used in the art, but shaking culture, stationary culture and culture with aeration may be preferably employed. The culture is generally conducted at a temperature of about 20° C. to 40° C., preferably at about 30° C.

It is desirable that the pH value of the culture medium is within the pH range of about 6.0–9.0, preferably about 7.0–8.0. The fermentation is generally continued for about 4 days to 8 days, preferably about 5 to 7 days. The substrate may be added to the culture medium either in a finely divided form or as a solution in a suitable organic solvent, such as dimethylformamide, methanol, acetone and the like.

It has also been found that addition of an inhibitor to a culture medium at a concentration of about $10^{-3}$ to $10^{-5}$ mole improves the yield of the desired 3α,5-cyclo-6β,19-oxido-5α-androstan-17-one. Although the details of such improvement are not fully understood, it is surely believed that such an inhibitor effectively prevents the microorganism from further conversion of the resulting androstane to other undesired compounds. Suitable examples of the inhibitor to be employed for such purposes include 2,2′-bipyridine, (α,α′-dipyridyl), pyrogallol, thymol, thiourea, sodium diethyl dithiocarbamate, ethylenediaminetetraacetic acid and salts thereof (disodium and tetrasodium salts), pentachlorophenol, potassium cyanide, sodium azide and the like.

The isolation of the desired product from the fermentation broth may be conducted by any suitable manner well-known in the art. For instance, the broth is extracted several times with ethyl acetate, the combined extracts are washed successively with aqueous sodium carbonate and water, dried over anhydrous sodium sulfate and concentrated to leave oily residue. The residue is chromatographed through a column of alumina with benzene-n-hexane (1:1) to give the desired androstane, which may be further purified by recrystallization from a suitable solvent such as n-hexane.

The following examples are given solely for the purpose of illustration of this invention, but they should not be construed as limiting the scope thereof.

Example 1

A culture medium comprising the following ingredients was prepared:

| Ingredient: | Grams |
|---|---|
| Glucose | 30 |
| Peptone | 30 |
| Meat extract | 30 |
| Soduim chloride | 9 |
| Water to 3 l. | |

The culture medium was adjusted to pH 7.2 and divided into thirty 500 ml. shaking flasks, each containing 100 ml. of the medium. After sterilization at 120° C. (under pressure of 15 lbs.) for 15 minutes, a substrate of 500 mg. of 3α, 5-chloro-6β,19-oxido-5α-cholestane prepared according to French Patent 1,353,691 and dissolved in 50 ml. of dimethylformamide was added with each 1 ml. portion to these flasks (alternatively, the substrate finely divided in a mortar may be added with each 10 mg. portions to these flasks). Then, Corynebacterium equi (IAM 1038) was inoculated and shaking culture was carried out at 30° C. with 120 r.p.m. for 6 days. At the end of this time, the pH of the fermentation broth was a pH of 8.2–8.4. After incubation, the fermentation broth was collected and extracted three times with ethyl acetate. The combined exracts were concentrated under reduced pressure to about 500 ml. volume. The resulting concentrate was washed twice with a 2% aqueous sodium carbonate solution and water, respectively, and, after drying, further concentrated to oily substance, which was then chromatographed through a column of alumina with benezene-n-hexane (1:1). After removal of the solvent, the resulting crystalline substance was recrystallized from n-hexane to yield 3α,5-cyclo-6β,19-oxido-5α-androstane-17-one, melting at 137–138° C.

By employing Arthrobacter ureafaciens (IAM 1658), there was similarly obtained the desired androstane.

Example 2

Following the same procedure as in Example 1 except that the culture medium having the following composition was employed, there was similarly obtained the desired androstane:

| Ingredient: | Grams |
|---|---|
| Corn steep liquor | 21 |
| Ammonium nitrate | 6 |
| Dipotassium hydrogenphosphate | 1.5 |
| Magnesium sulfate | 1.5 |
| Water to 3 l. | |

Following the same procedure as described above except that 3α,5-cyclo-6β,19-oxido-5α-ergostane (-sitostane orstigmastane) was employed, there was obtained similar results.

Example 3

Following the same procedure as in Example 2 except that the culture medium additionally contained 2,2′-bipyridine at a molar concentration of $1.0 \times 10^{-4}$ to $8 \times 10^{-5}$, there was obtained the desired androstane in a further improved yield.

The same procedure as described above was repeated except that the following inhibitor was employed instead of 2,2′-bipyridine, there can be similarly accomplished the successful results: pyrogallol, thymol, thiourea, sodium diethyl dithiocarbamate, ethylenediaminetetraacetic acid (free acid, disodium salt or tetrasodium salt), pentachlorophenol, potassium cyanide or sodium azide.

Example 4

Following the same procedure as in Example 2 except that Arthrobacter simplex (IAM 1660) was employed instead of C. equi, there was similarly obtained the desired androstane.

By employing Arthrobacter ureafaciens, there can be accomplished similar result.

What is claimed is:
1. A method for the production of 3α,5-cyclo-6β,19-oxido-5α-androstan-17-one which comprises subjecting a compound having the formula

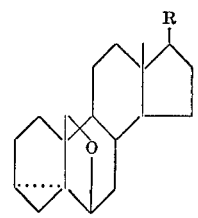

wherein R is a hydrocarbyl side chain of 8 to 10 carbon atoms to the action of a microorganism selected from those microorganisms of the genera Corynebacterium and Arthrobacter or to the action of the enzymes produced by the said microorganism under aerobic condition, and isolating the formed androstane.

2. The method according to claim 1 wherein the said microorganism is selected from those microorganisms consisting of *Corynebacterium equi* (IAM 1038), *Corynebacterium xerosis, Arthrobacter simplex* (IAM 1660) and *Arthrobacter ureafaciens* (IAM 1658).

3. The method according to claim 1 wherein the said compound is selected from the compounds consisting of 3α,5-cyclo-6β,19-oxido-5α-cholestane,
3α,5-cyclo-6β,19-oxido-5α-ergostane,
3α,5-cyclo-6β,19-oxido-5α-sitostane, and,
3α,5-cyclo-6β,19-oxido-5α-stigmastane.

4. The method according to claim 1 wherein during the microbial action there is present an inhibitor selected from the group consisting of 2,2'-bipyridine, pyrogallol, thymol, thiourea, sodium diethyl dithiocarbamate, ethylenediaminetetraacetic acid and dissodium and tetrasodium salts, potassium cyanide and sodium azide.

References Cited
UNITED STATES PATENTS 3,388,042   6/1968   Arima et al.
3,398,054   8/1968   Vezina et al.

ALVIN E. TANENHOLTZ, Primary Examiner

U.S. Cl. X.R.

260—239.55